United States Patent

[11] 3,591,029

| [72] | Inventor | Boyde A. Coffey<br>1712 Vallecito Drive, La Puente, Calif. 91745 |
|---|---|---|
| [21] | Appl. No. | 756,067 |
| [22] | Filed | Aug. 28, 1968 |
| [45] | Patented | July 6, 1971 |

[54] CYCLE CARRIER FOR AN AUTOMOTIVE VEHICLE
4 Claims, 5 Drawing Figs.

| [52] | U.S. Cl. | 214/450, 224/42.03 B |
|---|---|---|
| [51] | Int. Cl. | B60r 9/10 |
| [50] | Field of Search | 214/450; 224/42.03, 42.03 B, 42.06, 42.08 |

[56] References Cited
UNITED STATES PATENTS

| 3,176,903 | 4/1965 | Farley | 224/42.03 (B) |
|---|---|---|---|
| 3,366,256 | 1/1968 | Meredith et al. | 214/450 |
| 3,458,073 | 7/1969 | Dawson | 214/450 |

*Primary Examiner*—Gerald M. Forlenza
*Assistant Examiner*—Robert J. Spar
*Attorney*—Boniard I. Brown

ABSTRACT: A cycle carrier for an automotive vehicle is provided. The carrier has a cycle-supporting platform which is attached to the vehicle for movement between an elevated travel position, wherein the platform is disposed to support the wheeled cycle for transportation by the vehicle, and a lower cycle-loading and unloading position, wherein the platform is disposed to permit rolling movement of the cycle to and from the platform.

PATENTED JUL 6 1971　　　　　　　　　　　3,591,029
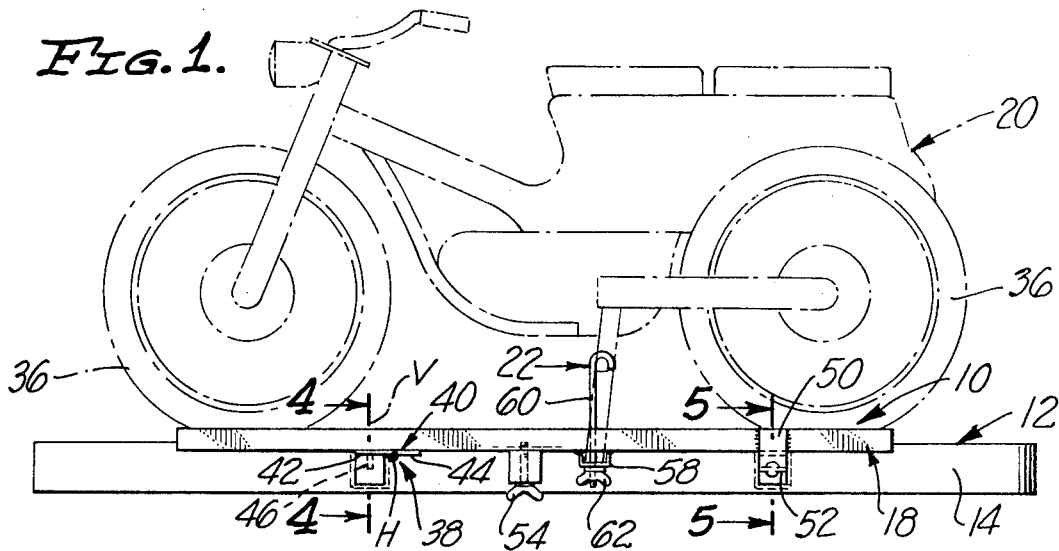
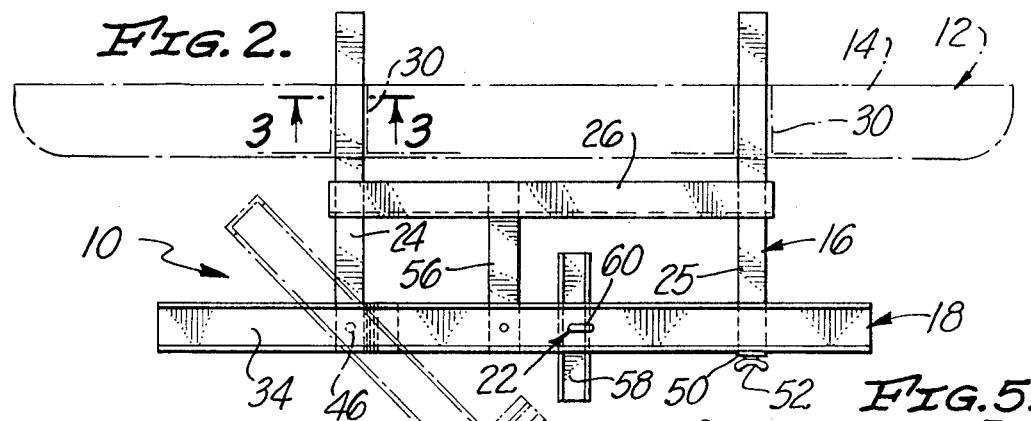
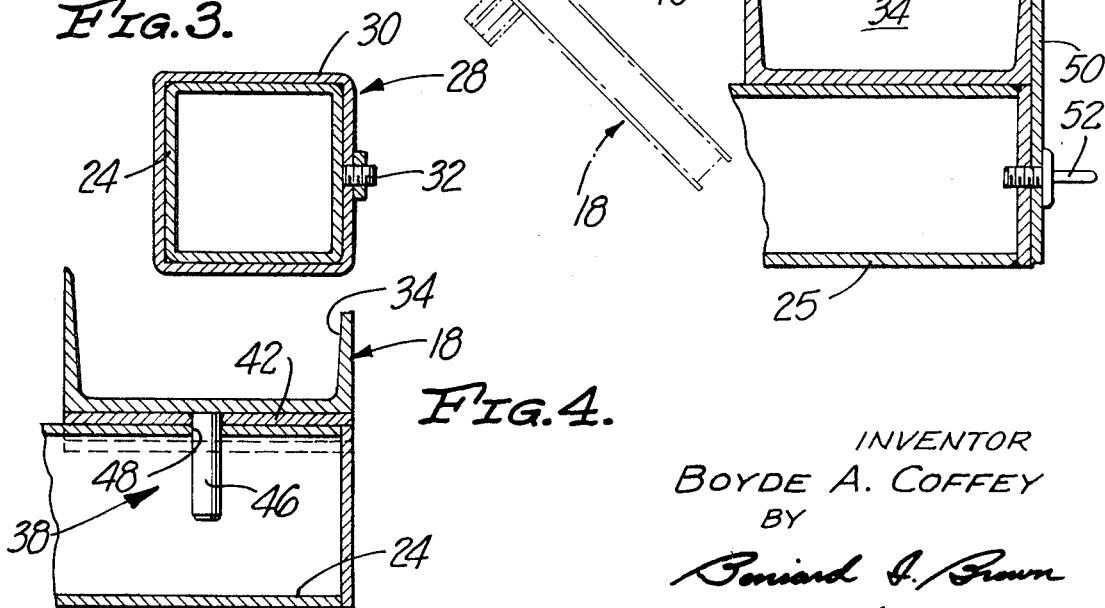
INVENTOR
BOYDE A. COFFEY
BY
Bernard J. Brown
ATTORNEY 3,591,029

CYCLE CARRIER FOR AN AUTOMOTIVE VEHICLE

BACKGROUND OF THE INVENTION

1. Field of the Invention

This invention relates generally to improvements in cycle carriers of the class which are mounted on automotive vehicles for transporting power-driven cycles and the like on the vehicles. More particularly, the invention relates to a cycle carrier of this class which is uniquely constructed and arranged to facilitate loading of a cycle onto and unloading of a cycle from the carrier.

2. Description of the Prior Art

It is now common practice to transport motor-driven cycles on camper trucks and other automotive vehicles, particularly vacation vehicles, to permit initial travel in the vehicle to a desired destination and later use of the cycle at the destination. Accordingly, a variety of cycle carriers for automotive vehicles have been devised. One type of carrier for this purpose, for example, comprises a cycle-supporting platform which is rigidly mounted in an elevated position on a vehicle for supporting the cycle wheels. Means are provided for securely fastening the cycle in travel position on the platform. Other types of carriers are arranged to support cycles in different ways. The existing cycle carriers, however, are characterized by the common deficiency that each requires bodily lifting of the cycle to and from its travel position on the carrier. This lifting action is difficult because of the size and weight of most motor driven cycles.

SUMMARY OF THE INVENTION

The present invention provides an improved cycle carrier of the class described which avoids the above-noted and other disadvantages of the existing carriers. To this end, the present carrier is characterized by a cycle-supporting platform which is movable between a cycle-loading and unloading position, hereinafter referred to simply as a loading position, and a travel position. When in loading position, the carrier platform is located close to the ground to permit a cycle to be easily wheeled onto and from the platform. When in travel position, the platform is elevated well above the ground to permit high-speed travel of the vehicle. Means are provided for securing the platform in its travel position and for securing a cycle to the platform.

In the illustrative embodiment of the invention, the cycle platform is hinged at one end to its supporting vehicle for swinging movement of the platform between its travel and loading positions. When in travel position, the platform is horizontally disposed in an elevated position. When in loading position, the platform slopes downwardly with its lower end resting on the ground so as to form a ramp. In this ramp configuration, a cycle may be easily wheeled onto and from the platform. A unique advantage of the present cycle carrier, in addition to this easy loading feature, resides in the fact that approximately one-half the weight of the platform and the cycle supported thereon is carried by the vehicle during raising and lowering of the platform between its travel and loading positions. As a consequence, the task of placing the cycle in and removing the cycle from travel position is greatly simplified. According to a unique feature of the invention, the platform is attached to the vehicle by a compound hinge connection which accommodates horizontal swinging movement of the platform toward and away from the vehicle, as well as vertical swinging movement of the platform between its travel and loading positions, in such a way as to permit location of the platform, when in loading position, in the most convenient attitude for wheeling of a cycle onto and from the platform.

BRIEF DESCRIPTION OF THE DRAWINGS

FIG. 1 is a side elevation of a cycle carrier according to the invention, illustrating the carrier supporting a cycle in elevated travel position;

FIG. 2 is a top plan view of the cycle carrier;

FIG. 3 is an enlarged section taken on line 3-3 in FIG. 2;

FIG. 4 is an enlarged section taken on line 4-4 in FIG. 1; and

FIG. 5 is an enlarged section taken on line 5-5 in FIG. 1.

DESCRIPTION OF THE PREFERRED EMBODIMENT

Referring now to these drawings, there is illustrated a cycle carrier 10 according to the invention installed on an automotive vehicle 12. For convenience, only the bumper 14 of the vehicle is shown. The cycle carrier has a frame 16 to be attached to the vehicle and a cycle-supporting platform 18 mounted on the frame. The platform is movable between its travel position of FIG. 1, wherein the platform is located in an elevated, generally horizontal attitude, and its cycle-loading position illustrated in broken lines in FIG. 2, wherein the platform is located to permit a cycle 20 to be rolled or wheeled with ease onto and from the platform. Means 22 are provided for securely fastening the cycle in its travel position on the carrier.

Referring now in greater detail to the embodiment of the invention which has been selected for illustration, the carrier frame 16 has a pair of spaced and generally parallel rigid bars 24, 25 joined by a cross member 26 to form a rigid frame structure. In this case, the frame bars 24 are box channels of rectangular cross section. On two corresponding ends of the frame bars 24, 25 are coupling means 28 for attaching the frame to the vehicle 12. The illustrated coupling means comprise short box channels or sleeves 30 which are dimensioned to slidably receive the frame bars and form coupling sockets for these bars. The sleeves or coupling sockets 30 are welded within openings in the vehicle bumper 14. Set screws 32 are provided for locking the frame bars in the sockets. When installed on the vehicle 12, the carrier frame 16 is disposed with its frame bars 24, 25 in a common, normally generally horizontal plane. The bars extend from and normal to the bumper.

The illustrated cycle platform 18 is a channel bar having an upwardly opening channel 34 for receiving the cycle wheels 36. In its travel position of FIG. 1, the ends of the channel or platform 34 overly and are supported on the outer ends of the frame bars 24, 25. One end of the platform is attached to the frame bar 24 by a compound hinge means 38 having a vertical pivot axis V and a horizontal pivot axis H about which the platform may be rotated. The illustrated hinge means 38 comprises a hinge 40 having a pair of hinge plates 42, 44 pivotally joined on the horizontal pivot axis H. Hinge plate 42 mounts a rigid, depending pivot journal 46. This journal fits rotatably within a journal bore 48 in the upper wall of the frame bar 24 on the vertical pivot axis V. The other hinge plate 44 is welded or otherwise rigidly attached to the under side of the cycle platform 18.

The compound hinge means 38 connects the cycle platform 18 to the carrier frame 16 for movement of the platform from its travel position to its cycle-loading position by initial outward rotation or swinging of the free end of the platform away from the vehicle 12 about the vertical pivot axis V, as shown in FIG. 2, to locate the latter platform end clear of its supporting frame bar 25, and final downward rotation or swinging of the platform to locate its free end in supporting engagement with the ground. In this cycle-loading position, then, the cycle platform 18 slopes downwardly to form a ramp onto and from which the cycle 20 may be rolled or wheeled with relative ease. The platform is returned to its travel position by reversing the above procedure.

Welded to the free end of the cycle platform 18 is a depending bracket plate 50 mounting a wing screw 52. When the channel is in travel position, this plate abuts the outer end of the platform supporting frame bar 25. Wing screw 52 is threaded in the bar to secure the platform in travel position. An additional wing screw 54, carried by a channel member 56 rigid on the carrier frame 16, may be threaded in the under side of the platform 18 to secure the latter in travel position and retain the hinge pin 46 in its journal bore 48.

Welded to the under side of the cycle platform 18 is a bracket 58 which extends crosswise of the platform. This bracket provides a rest for engagement by the cycle kick stand to support the cycle 20 in its upright travel position on the platform. The cycle anchor or tie down 22 is a threaded hook 60 which engages over a part of the cycle and carries a wingnut 62 below the cycle platform 18. Tightening of this nut pulls the hook downwardly to firmly clamp the cycle in travel position on the platform.

One important advantage of the present cycle carrier is that it permits the cycle 20 to be loaded onto and removed from the cycle platform 18 with relative ease and without bodily lifting the cycle. Another advantage resides in the fact that during raising and lowering of the platform to and from its travel position, with the cycle position on the platform, one-half of the combined weight of the cycle and platform is carried by the vehicle 12. Accordingly, only the remaining half of the weight need be supported by the person or persons operating the carrier. It will be evident that while the illustrated embodiment of the invention has a frame for attachment to the vehicle 12, the compound hinge means 38 of the carrier could conceivably be attached directly to a part of the vehicle. In this case, another part of the vehicle may serve to provide support for the free end of the cycle platform 18 in its travel position. For example, both of these vehicle parts may be furnished by a wide bumper on the vehicle, such as is sometimes installed on the rear of camper trucks to serve as a combined bumper and step. In this latter type of cycle carrier installation, the vehicle effectively provides the carrier frame.

While the invention has been disclosed in connection with a specific physical embodiment thereof, it is evident that various modifications of the invention are possible within the spirit and scope of the following claims.

I claim:

1. In combination:
    an automotive vehicle having a rear bumper, and
    a cycle carrier on said vehicle comprising a frame including a pair of spaced parallel frame bars of rectangular cross section having front and rear ends, and a crossmember extending between and rigidly joining said bars between their ends, means for attaching the front ends of said bars to the vehicle to support said frame in a horizontal elevated position on the vehicle including sleeves extending through openings in and rigidly joined to said vehicle bumper and slidably receiving the front ends of said frame bars, and means releaseably securing said frame bars in said sleeves, an elongate cycle-supporting channel bar extending between and over the rear ends of said frame bars and having an upwardly opening channel, compound hinge means mounting one end of said channel bar on the rear end of the adjacent frame bar for vertical swinging movement of said channel bar between an elevated travel position wherein said channel bar rests on said frame bars and an inclined cycle-loading position wherein the other end of said channel bar is disposed to rest on the ground such that said channel bar is inclined to permit a cycle to be rolled onto and from said channel bar, means for releaseably securing said channel bar in a travel position, and means for releaseably attaching a cycle to said channel bar.

2. A cycle carrier for an automotive vehicle, comprising:
    a frame including a pair of spaced parallel frame bars of rectangular cross section having front and rear ends, and a cross member extending between and rigidly joining said bars between their ends,
    means for attaching the front ends of said bars to the vehicle to support said frame in a horizontal elevated position on the vehicle comprising rectangular sleeves slidably receiving the front ends of said frame bars and adapted to be fixed within openings in the rear bumper of said vehicle, and means releaseably securing said frame bars in said sleeves,
    an elongate cycle-supporting channel bar extending between and over the rear ends of said frame bars and having an upwardly opening channel,
    compound hinge means mounting one end of said channel bar on the rear end of the adjacent frame bar for vertical swinging movement of said channel bar between an elevated travel position wherein said channel bar rests on said frame bars and an inclined cycle-loading position wherein the other end of said channel bar is disposed to rest on the ground such that said channel bar is inclined to permit a cycle to be rolled onto and from said channel bar,
    means for releaseably securing said channel bar in a travel position, and
    means for releaseably attaching a cycle to said channel bar.

3. A cycle carrier for an automotive vehicle, comprising:
    a frame including a pair of spaced parallel frame bars of rectangular cross section having front and rear ends, and a crossmember extending between and rigidly joining said bars between their ends,
    means for attaching the front ends of said bars to the vehicle to support said frame in a horizontal elevated position on the vehicle,
    an elongate cycle supporting channel bar extending between and over the rear ends of said frame bars and having an upwardly opening channel,
    compound hinge means mounting one end of said channel bar on the rear end of the adjacent frame bar for vertical swinging movement of said channel bar between an elevated travel position wherein said channel bar rests on said frame bars and an inclined cycle-loading position wherein the other end of said channel bar is disposed to rest on the ground such that said channel bar is inclined to permit a cycle to be rolled onto and from said channel bar,
    means for releaseably securing said channel bar in a travel position, and means for releaseably attaching to said channel bar a cycle having a kick stand, said cycle attaching means comprising a transverse bracket below and extending beyond the sides of said channel bar and rigidly fixed to the under side of said channel bar in a position below the kick stand of said cycle when the latter is located in travel position on said channel bar, a hook carried by said bracket and engageable over a projection on said cycle, and means for drawing said hook downwardly toward said bracket to force said kick stand against said bracket.

4. A cycle carrier for an automotive vehicle, comprising:
    a frame including a pair of spaced parallel frame bars of rectangular cross section having front and rear ends, and a crossmember extending between and rigidly joining said bars between their ends,
    means for attaching the front ends of said bars to the vehicle to support said frame in a horizontal elevated position on the vehicle,
    an elongate cycle-supporting channel bar extending between and over the rear ends of said frame bars and having an upwardly opening channel,
    compound hinge means mounting one end of said channel bar on the rear end of the adjacent frame bar for vertical swinging movement of said channel bar between an elevated travel position wherein said channel bar rests on said frame bars and an inclined cycle loading position wherein the other end of said channel bar is disposed to rest on the ground such that said channel bar is inclined to permit a cycle to be rolled onto and from said channel bar,
    means for releaseably attaching a cycle to said channel bar,
    means for releaseably securing said channel bar in a travel position comprising a frame member joined to said crossmember and extending below and in supporting contact with the under side of said channel bar when said channel bar is in travel position, a removable fastener extending through aligned holes in said frame member and channel bar, and a depending flange on said other end of said channel bar engageable with the rear end of the adjacent frame bar in said travel position, and a releaseable fastener joining said flange and latter frame bar.